United States Patent
Medvedeva et al.

(10) Patent No.: US 11,326,877 B2
(45) Date of Patent: May 10, 2022

(54) ADAPTIVE METHOD FOR MEASURING MOVEMENTS

(71) Applicants: Marina Vladimirovna Medvedeva, Voskresensk (RU); Konstantin Borisovich Utkin, St.Petersburg (RU)

(72) Inventors: Marina Vladimirovna Medvedeva, Voskresensk (RU); Konstantin Borisovich Utkin, St.Petersburg (RU)

( * ) Notice: Subject to any disclaimer, the term of this patent is extended or adjusted under 35 U.S.C. 154(b) by 89 days.

(21) Appl. No.: 16/340,391

(22) PCT Filed: Nov. 11, 2016

(86) PCT No.: PCT/RU2016/000771
§ 371 (c)(1),
(2) Date: Apr. 9, 2019

(87) PCT Pub. No.: WO2018/074943
PCT Pub. Date: Apr. 26, 2018

(65) Prior Publication Data
US 2019/0234731 A1   Aug. 1, 2019

(30) Foreign Application Priority Data
Oct. 21, 2016 (RU) .............................. 2016141390

(51) Int. Cl.
*G01B 21/00* (2006.01)
*G01P 13/00* (2006.01)
*G01D 5/247* (2006.01)
*G01V 15/00* (2006.01)
*B61L 25/02* (2006.01)
*G01S 1/00* (2006.01)
*G01C 22/00* (2006.01)

(52) U.S. Cl.
CPC .............. *G01B 21/00* (2013.01); *B61L 25/02* (2013.01); *G01D 5/247* (2013.01); *G01P 13/00* (2013.01); *G01V 15/00* (2013.01); *G01C 22/00* (2013.01); *G01S 1/00* (2013.01)

(58) Field of Classification Search
None
See application file for complete search history.

(56) References Cited

U.S. PATENT DOCUMENTS

| | | | |
|---|---|---|---|
| 8,712,690 B1* | 4/2014 | White | G01S 5/0252 701/526 |
| 2009/0286548 A1* | 11/2009 | Coronel | G01S 5/14 455/456.1 |
| 2015/0039226 A1* | 2/2015 | Ghose | H04W 4/021 701/525 |
| 2015/0276387 A1 | 10/2015 | Kletter et al. | |

FOREIGN PATENT DOCUMENTS

| | | |
|---|---|---|
| DE | 202006020082 U1 | 10/2007 |
| RU | 2220402 C2 | 12/2003 |
| RU | 133282 U1 | 10/2013 |
| RU | 2594669 C1 | 8/2016 |
| RU | 2598690 C1 | 9/2016 |

OTHER PUBLICATIONS

Villadangos, J. M.; Ureña, J.; Mazo, M.; Hernández, Á.; De Marziani, C.; Jiménez, A.; Álvarez, F.; Improvement of Cover Area in Ultrasonic Local Positioning System Using Cylindrical PVDF Transducer; 2007; IEEE; p. 1473-1477 (Year: 2007).*

* cited by examiner

*Primary Examiner* — Arleen M Vazquez
*Assistant Examiner* — Terence E Stifter, Jr.

(57) ABSTRACT

The invention can be used for determining absolute movements of objects. The problem to be solved consists in increasing the accuracy of the measurement of movements of an object when obstacles are present in the trajectory of motion thereof by eliminating error accumulation in the positioning of signal sources. A transducer is mounted on an object, separate sources of uniquely coded signals are used and/or groups of sources of a uniquely coded signal are formed, the separate sources of uniquely coded signals and/or formed groups of sources of a uniquely coded signal are placed randomly along the trajectory of movement of the object at any distance between any two consecutively mounted separate sources of a uniquely coded signal and/or between any two formed groups of sources of a uniquely coded signal, said distance not exceeding the measurement range of the transducer, a signal is directed at the moving object having the transducer, an output signal from the transducer regarding the position of the separate sources of uniquely coded signals and/or groups of sources of a uniquely coded signal is received, and the position of the object is determined.

9 Claims, No Drawings

ADAPTIVE METHOD FOR MEASURING MOVEMENTS

The invention relates to measuring equipment and can be used to determine the absolute movements of objects, for example, in metallurgy, automotive industry, crane technology, warehouse and production logistics, and production automation in general.

When expanding the scale of production tasks, increasing the efficiency of production processes is of great concern, which is achieved, among other things, by ensuring such technical characteristics as the speed and accuracy of determining the position of objects on the premises in different time periods.

Though, ensuring high accuracy in determining the position of an object is a difficult production task due to the dependence of this technical parameter on the accuracy and labour required for placing signal sources along an object's motion path, including the presence of obstacles difficult to remove along the object's path.

A method of determining the position of an object is known (see files.pepperl-fuchs.com/selector_files/navi/productInfo/doct/tdoct3785_eng.pdf, p. 9), consisting in arranging an array of transducers on one side of the electronic head and an array of receivers on another side, providing the object with the electronic head, positioning a tape with a different number of slots located at different distances (that is, having a unique coding) along the object's motion path, and receiving the output signal indicating the object's position from the receivers when moving the object along the tape.

Said method involves the installation of a ruler with slots, which should be continuous when conducting measurements. The process of installing a long continuous ruler is labour and time consuming, and not always possible due to the presence of obstacles along the object's motion path. Also, this method of measurement involves the smooth movement of an object without jumps and vibrations, which is not always realizable.

A method of determining the position of an object is known (see www.sick.com/media/dox/9/69/969/Mounting_instructions_POMUX_KH53_POMUX_KH53_Advanced_de_en_IM0011969.PDF), which is considered to be the closest analogue to the method as claimed, consisting in arranging permanent magnets in series and according to their numbers along the motion path, while respecting the equal distance therebetween, then a transducer is being mounted on the object, directing the signal on the object with the transducer, receiving the output signal indicating the position of the enumerated signal sources, and determining the object position.

Said method suggests the arrangement of signal sources with a predetermined position along the path and strict observance of the same distance therebetween, that is, the accuracy of measuring the position of the object in this case depends on the accuracy of this arrangement of signal sources: any shift from the desired position leads to an accumulation of error when the object moves along the motion path. Also, if there are obstacles along the path, it is necessary to use several systems implementing this method, which greatly complicates production and increases its cost. At the same time the measurement of the object position is not carried out in the obstacle location. In addition, in the case of any signal source failure, it is necessary to replace it with a strictly similar signal source, which makes the method not always convenient to use.

It should be noted that the above methods for measuring the movements of an object use one particular type of signal sources and the corresponding type of transducers.

The objective of the invention is to create an adaptive method for measuring the movements of an object, wherein different types of signal sources and transducers can be used, providing measurements when there are obstacles along an object's motion path, and simplifying the process of positioning signal sources along the object's motion path.

The technical result is to improve the accuracy when measuring the movements of an object in the presence of obstacles on its motion path by eliminating the error accumulation when positioning signal sources.

The technical effect is achieved by an adaptive method for measuring movements, wherein a transducer is mounted on an object, separate sources of a uniquely coded signal are used and/or groups of sources of a uniquely coded signal are formed, wherein the separate sources of a uniquely coded signal and/or groups of sources of a uniquely coded signal formed are arranged randomly along an object's motion path at any distance between any two successively installed separate sources of a uniquely coded signal and/or between any two formed groups of sources of a uniquely coded signal not exceeding the transducer measurement range, the signal is directed on the moving object having the transducer, the output signal indicating the position of separate sources of a uniquely coded signal and/or groups of sources of a uniquely coded signal is received from the transducer, and the object position is determined.

Groups of sources of a uniquely coded signal are obtained by changing the number of signal sources and/or changing the distance between any two signal sources and/or changing the types of signal sources used.

Separate sources of a uniquely coded signal and/or groups of sources of a uniquely coded signal can be positioned, including along the object's motion path, at an equal distance between any two successively installed separate sources of a uniquely coded signal and/or between any two formed groups of sources of a uniquely coded signal not exceeding the transducer measurement range.

Separate sources of a uniquely coded signal and/or groups of sources of a uniquely coded signal, determined by the change in the signal sources number and/or the change in the distance between any two signal sources and/or the change in the types of signal sources used, allow for providing a lot of unique combinations of signal sources, whose location is determined not by the coordinate with possible deviations caused by such an equipment error, as is was the case with analogues, but by the transducer maximum measurement range: the greater the nominal measurement range of the transducer, the greater the range of possible installation of two successive separate sources of a uniquely coded signal and/or two successive groups of sources of a uniquely coded signal. Thus, at each section of the path not exceeding the transducer measurement range, randomly at any distance should be at least one source of a uniquely coded signal or one group of sources of a uniquely coded signal, which simplifies the procedure of their placement, provides a clear identification of the transducer position in any point in time, allows for accurate determining of the object position during its movement, thus improving the accuracy when measuring the movements of an object. Also, this method may be used if there are obstacles on the object's motion path, the length of which does not exceed the measurement range of the transducer, and only one system that implements the method as claimed may be used.

The use of separate sources of a uniquely coded signal and/or the formation of groups of sources of a uniquely coded signal, as well as their placement randomly on the path sections, allows not only for determining the object position and movement, but also for accurately identifying the numbers of separate sources of a uniquely coded signal and/or groups of signal sources and their other parameters if necessary.

Groups of sources of a uniquely coded signal can be pre-formed blocks with a body provided with separate signal sources, the arrangement of which is determined by the change in the number of signal sources and/or the change in the distance between any two signal sources and/or the change in the types of signal sources used.

Chips, code carriers, tags being a part of the radio frequency identification system can be used as separate sources of a uniquely coded signal.

For example, magnets, light sources, heat sources, any kinds of radiation sources, kinetic energy sources, pressure sources, ultrasonic waves, and materials with inductive and/or capacitive physical properties can be used as signal sources for forming groups of signal sources, i.e. virtually any material, coded information source (for example, barcodes, as well as 2D codes, 3D codes, nD codes (where n is an integer number) in the case when a group of signal sources includes signal sources of different types, each having its own measurement axis). Also, the signal source uniqueness can be ensured by the unique radiation power of each separate signal source (of the same type).

For example, Hall sensors, photo cells, magnetostriction transducer, inductive and capacitive transducers, radio frequency transducers, radiation transducers, pressure transducers and other transducers of various energy types can be used as transducers.

Also, components of the identification system such as a reader (processor) and a connected or a built-in antenna (radar, reading/recording head) can be used as transducers, wherein tags (chips, code carriers) will act as signal sources.

The processing of the output signal from the transducer is provided by appropriate equipment depending on the types of signal sources and converters used. Information for processing can be transmitted via various interfaces and protocols, for example, an analog interface, TCP/IP, Ethernet TCP/IP, UDP, EtherCAT, Ethernet, Varan, Profinet, IO-Link, ASInterface, Profibus, DeviceNet, CANopen, RS232, RS422, RS485.

When using this method, it is possible with high accuracy to obtain information about the place and time of the object in the production process, which increases the production management efficiency.

An adaptive method for measuring movements is implemented using the system containing a transducer, located on an object, and groups of sources of a uniquely coded signal, by changing the number of signal sources and/or changing the distance between any two signal sources and by changing the types of the sources used. Separate sources of a uniquely coded signal (chips, tags, code carriers) can also be used.

For example, an object is provided with a magnetostriction linear movement transducer having a movement measurement range a and being used as transducer. Groups of signal sources—uniquely coded magnets—are placed along the object's motion path at any distance from each other, not exceeding the transducer measurement range a. Thus, there is always at least one group of sources of a uniquely coded signal or two magnets with unique distance therebetween on the path section of length a.

Let's consider the case when, in each path section of length a, groups of uniquely coded magnets are used, having the same number of magnets, but a variable distance therebetween. That is, in the first path section of length a the magnets of the group are positioned at a distance $\Delta$ from each other to form the first unique set, in the second path section of length a the magnets of the group are positioned so that the rightmost magnet is moved away by a distance of $2\Delta$, in the third path section of length a the magnets of group are positioned so that the rightmost magnet is moved away by a distance of $3\Delta$, and so on. As a result, in any object's motion path section of length a opposite to the transducer sensitivity zone, there is a non-repeating (unique) combination of signal sources—within the group located at distances therebetween with non-repeating values, which allows for clear identifying the object position and determining its movement.

Also, the magnets of the group can be positioned so that the distance between them remains the same, but their number changes, that is, in the first path section of length a two magnets can be placed and in the second path section of length a—three magnets can be placed, etc. In this case, in any path section of length a opposite to the sensitivity zone of the movement transducer, a non-repeating combination of signal sources of group will be located, which allows for clear identifying the object position and determining its movement.

It is also possible to place the magnets of the group, when both the number of magnets and the distance between any two magnets change, that is, in the first path section of length a a group, for example, with two magnets at a distance $\Delta$ therebetween is placed, in the second path section of length a group with three magnets at a distance $2\Delta$ therebetween is placed, etc. In this case, in any path section of length a opposite to the sensitivity zone of the transducer, a non-repeating combination of signal sources of the group will be located, which allows for clear identifying the object position and determining its movement.

This method can be used when an obstacle difficult to remove is present on the object's path, the size of the obstacle not exceeding the measurement range of the transducer. If before the presence of an obstacle the groups of sources of a uniquely coded signal were optimally positioned, that is, at a maximum distance from each other, then in the presence of an obstacle, the next group of sources of a uniquely coded signal is placed in front of the obstacle, and the subsequent group of sources of a uniquely coded signal is placed already behind the obstacle, for example, at the maximum distance from the previous group.

Groups of sources of a uniquely coded signal are randomly placed on each path section of length a. When moving the object along the path with groups of sources of a uniquely coded signal arranged, the movement transducer outputs the position value for each said group, opposite which the object with the movement transducer mounted thereon is located. At the time point the object's first motion is started the processing equipment receives information about the object position coordinate at the starting point. This coordinate is taken as the zero of the coordinate system. During the progressive motion of the object in the direction of increasing its coordinates, set groups—of sources—of a uniquely coded signal come into the active zone of the transducer. In this case, at the moment when the successive group—of signal sources—enters the transducer active zone, according to the placement conditions for the group—of signal sources—the previous group of signal—sources will always be present in the transducer active zone. Thus, given the absolute coordinate of the previous group of signal sources, the absolute coordinate of the next group of signal sources is calculated. The resulting values are transmitted to the processing equipment, which, after receiving information about the object position relative to each specific group, calculates the absolute position of the object along the path. If it is necessary to measure the absolute value of the object position after switching the equipment power supply off, the obtained values of the position for each group of signal sources should be stored in the non-volatile memory of the processing equipment.

Also by the output signal from the movement transducer it is possible to determine the numbers of the groups of signal sources, the effect of which was exerted on the transducer, as well as any other parameters of said groups, if needed.

In addition, the pre-formed groups of sources of a uniquely coded signal and/or separate sources of a uniquely coded signal from several path sections of length a can be randomly reversed, if necessary, to ensure the location of at least one separate source of a uniquely coded signal and/or one such group at a distance not exceeding the transducer measurement range. Also, if necessary, any number of additional separate sources of a uniquely coded signal and/or formed groups of sources 4 of a uniquely coded signal can be added in any path section of length a. The adaptability of the suggested method for measuring movements allows for increasing the measurement accuracy while excluding its dependence on the accuracy of the signal sources positioning. In its turn, the absence of the need to locate separate sources of a uniquely coded signal and/or groups in a certain order contributes to the freedom of their arrangement, allowing for performing this arrangement simultaneously by several separate groups, which significantly reduces the deployment time of the object measurement system.

The extension of the distance to which it is possible to move an object can be calculated as follows. For example, a transducer by Balluff GmbH is used as magnetostrictive linear movement transducer, the nonlinearity of which is 30 µm, the measurement range is 4500 mm. If this transducer and a group with two signal sources are used, the distance change therebetween making 31 µm at each path section, and the minimum required distance between signal sources should be at least 60 mm, it is possible to obtain:

$$\frac{\frac{4500}{2} - 60}{0.03 + 0.001} = 70645 \quad (1)$$

unique positions of signal sources.

Thus, the total measurement range when using groups with two sources of a uniquely coded signal is:

$$4500 \times 70645 = 317902500 \text{ mm} = 317.9 \text{ km} \quad (2)$$

at a repeatability of 30 µm.

Repeatability is a characteristic of the quality of measurement results, which reflects the degree of approximation of one to another by the results of repeated measurements for the same physical quantity, carried out under the same conditions.

As a result, an adaptive method for measuring the movements of an object allows for increasing the accuracy when measuring the movements of an object with a significant increase in the movement distance and in the presence of obstacles difficult to remove along the object's path. This greatly simplifies the process of positioning signal sources arranged into uniquely coded groups before they are placed along an object's motion path, which reduces the labour required when implementing the method in general and improves its usability.

It also increases the speed of determining the object position and its movement throughout the production area, which ensures an increase in the efficiency of the production process as a whole. In addition, to measure the movements in cases with passive power sources, it is necessary to provide power to only one transducer mounted on the object, which also simplifies the measurement method.

The advantage of the adaptive method is the ability to automatically build a coordinate grid consisting of separate sources of a uniquely coded signal and/or groups of sources of a uniquely coded signal for determining the position of an object by passing an object through all or a part of said signal source variants. With this purpose the absolute coordinate of any separate source of a uniquely coded signal and/or a group of sources of a uniquely coded signal are determined along the object's path, the distance between successively located separate sources of a uniquely coded signal or groups of sources of a uniquely coded signal is calculated relative thereto, the absolute coordinates of each separate source of a uniquely coded signal and/or a group of sources of a uniquely coded signal in space are automatically calculated, provided that any two successive separate sources of a uniquely coded signal and/or two successive groups of sources of a uniquely coded signal are located within the transducer measurement range. Thus, a table showing space location of separate source of a uniquely coded signal and/or a group of sources of a uniquely coded signal is automatically generated, being the basis the object to be positioned on.

Moreover, when using the adaptive method, it becomes possible to track location changes of sources of a uniquely coded signal and/or groups of sources of a uniquely coded signal in space without stopping positioning, as well as increasing the path and distance of positioning by adding new sources of a uniquely coded signal and/or groups of sources of a uniquely coded signal on the object's motion path. The system implementing this method continues its operation in the case of individual or mass loss of separate sources of a uniquely coded signal and/or groups of sources of a uniquely coded signal, if the space location conditions for signal sources and/or groups of signal sources are not violated. In other words, when using the adaptive method, two functions are simultaneously and continuously performed: positioning an object with determining its absolute coordinate, and tracking additions and exclusions of sources of a uniquely coded signal and/or groups of sources of a uniquely coded signal, and changes in the location of sources of a uniquely coded signal and/or groups of sources of a uniquely coded signal in space with automatic adjustment of the table showing space location of separate source of a uniquely coded signal and/or a group of sources of a uniquely coded signal, if the necessary conditions for their location are not violated.

It is also important that for the implementation of the method different signal sources, transducers and the corresponding equipment for processing the output signal can be used, which makes it universal.

The invention claimed is:

1. An adaptive method for measuring movements, characterized in that the method comprises the following steps:
   mounting a transducer on an object,
   providing separate sources of a uniquely coded signal or groups of sources of a uniquely coded signal, wherein uniqueness of coding is achieved due to the number of sources of a uniquely coded signal or groups of sources of a uniquely coded signal and different distances therebetween, wherein each source of a uniquely coded signal or each group of sources of a uniquely coded signal is coded uniquely relative to another source of a uniquely coded signal or another group of sources of a uniquely coded signal, arranging the separate sources of a uniquely coded signal or groups of sources of a uniquely coded signal along an object's motion path provided that the distance between any two successively installed separate sources of a uniquely coded signal or between any two formed groups of sources of a uniquely coded signal does not exceed the transducer measurement range, directing the uniquely coded signal on the moving object having the transducer, receiving an output signal indicating the position of separate sources of a uniquely coded signal or groups of sources of a uniquely coded signal from the transducer by the processing equipment, and determining the object position by the processing equipment.

2. The method according to claim 1, wherein groups of sources of a uniquely coded signal are obtained by changing the number of signal sources or changing the distance between any two signal sources or changing the types of signal sources used.

3. The method according to claim 1, wherein separate sources of a uniquely coded signal or groups of sources of a uniquely coded signal are positioned along the object's motion path, at an equal distance between any two successively installed separate sources of a uniquely coded signal or between any two formed groups of sources of a uniquely coded signal not exceeding the transducer measurement range.

4. The method according to claim 1, wherein the separate sources of a uniquely coded signal are selected from chips, code carriers or tags.

5. The method according to claim 1, wherein the separate sources of a uniquely coded signal are selected from magnets, light sources, heat sources, any kinds of radiation sources, kinetic energy sources, pressure sources, ultrasonic waves or materials with inductive or capacitive physical properties.

6. The method according to claim 1, wherein the transducer is selected from Hall sensors, photo cells, magnetostriction transducer, inductive and capacitive transducers, radio frequency transducers, radiation transducers or pressure transducers.

7. The method according to claim 1, wherein the transducer is constituted by a combination of a processor and a connected or a built-in antenna, or radar, or reading/recording head.

8. The method according to claim 1, wherein the numbers of separate sources of a uniquely coded signal or groups of sources of a uniquely coded signal are determined by the output signal from the transducer.

9. The method according to claim 1, wherein a coordinate grid is additionally built for determining the position of an object, the object is positioned with determining its absolute coordinate, and additions and exclusions of sources of a uniquely coded signal or groups of sources of a uniquely coded signal, changes in the location of sources of a uniquely coded signal or groups of sources of a uniquely coded signal in space are tracked with automatic adjustment of the table showing space location of separate source of a uniquely coded signal and/or a group of sources of a uniquely coded signal.

* * * * *